United States Patent [19]
Elliott

[11] 3,888,024
[45] June 10, 1975

[54] AUDIO-VISUAL TEACHING APPARATUS

[76] Inventor: John Kenneth Elliott, 82 Baybrook Cres., Scarborough, Ontario, Canada

[22] Filed: Aug. 9, 1973

[21] Appl. No.: 386,981

[52] U.S. Cl. .................................. 35/35 R; 35/9 E
[51] Int. Cl. ........................................... G09b 17/00
[58] Field of Search......... 35/35 R, 35 B, 35 C, 9 E, 35/9 F, 8 R

[56] References Cited
UNITED STATES PATENTS

| | | | |
|---|---|---|---|
| 2,840,926 | 7/1958 | Campbell | 35/35 B |
| 3,081,560 | 3/1963 | Campo Agud | 35/35 R |
| 3,120,708 | 2/1964 | Silber | 35/9 E |
| 3,146,663 | 9/1964 | Kirkconnell et al. | 35/35 R X |
| 3,266,172 | 8/1966 | Heinberg | 35/8 R |

OTHER PUBLICATIONS
Webster's Third New International Dictionary, 1961, definition of "dactylology," page 569.

*Primary Examiner*—Wm. H. Grieb

[57] ABSTRACT

Apparatus and method for teaching a person how to communicate with other persons. The method comprises displaying continuously at least two sequences of images to the person being taught, which relate to communication among persons and which are different visual representations of identical subject matter, and selectively precluding visual display of at least one of the sequences of images to the person being taught. The apparatus includes means for simultaneously visually displaying the sequences of images and means selectively operable to preclude visual display of any one or more of the sequences of images.

8 Claims, 4 Drawing Figures

AUDIO-VISUAL TEACHING APPARATUS

FIELD OF INVENTION

This invention relates to a method and apparatus for teaching a person how to communicate with other persons and it may be particularly directed to the instruction of persons who are perceptually handicapped.

BACKGROUND OF THE INVENTION

Modern methods of teaching symbolic language still rely almost entirely upon the basic progression of learning to hear, then to speak, then to read and finally to write. For those persons who through physical or psychological impairment have difficulty in relating to auditory stimuli and, in consequence, are unable to speak, the primary sensory avenue through which learning takes place is vision and the requisite first step in learning how to communicate is comprehending visual language in terms of the person's previous visual experience. This experience is usually fragmentary and devoid of any logical ordering, being the result of multiple unrelated visual impressions compounded without benefit of grammatical continuity.

To relate real living experience to visual symbolism of any sort without an auditory bridge is a considerable task for the teacher, and a far greater one for the pupil. Static pictures are limited both in appeal and explanatory value, and teaching becomes a process of endless repetition of mime and demonstration -- much of which is open to misinterpretation, as the precise relationship between the demonstration act and its symbolic counterpart is difficult to achieve, and confirmation of understanding is lacking due to the limited communication between teacher and pupil. The teacher cannot be sure of comprehension before proceeding to the next step, and the pupil cannot ask for clarification; or the pupil indicates comprehension in the hopes of clarification by the following step, and then has no recourse to recall the step incorrectly understood.

In general, in any group of students, all are at different levels of comprehension and experience, so the problem of teaching — and particularly the problem of teaching a person how to communicate with other persons — is compounded. Education becomes a frustration for both teacher and pupil, and early learning potential may particularly be lost, so that few persons with handicaps of the sort discussed above may achieve an adequate level of education and the ability to undertake skilled employment.

The method and apparatus according to this invention has therefore been developed to permit a student to respond kinesthetically to visual stimulation by simultaneously presenting to him sequences of symbolic forms of communication which relate to the subject matter to be taught. Optionally, a synchronized audio system which describes the displayed subject matter may also be presented. The symbolic forms of communication are presented as sequences of images and are displayed to the student in a way which permits him to select any or all of the various sequences of images being displayed so as to increase his comprehension of the subject matter being taught or confirm his understanding of the subject matter as determined by his prior knowledge or experience in the related fields.

The apparatus according to this invention for carrying out this method of teaching a person how to communicate with other persons comprises: means for simultaneously visually displaying at least two sequences of images which relate to communication among persons and which are different visual representations of identical subject matter; and means selectively operable to preclude visual display of at least one of the sequences of images to the person being taught. Means may also be provided on the apparatus for reproducing audible speech which relates to the subject matter being visually presented. As a result, a student may learn from the apparatus without the full-time supervision of a teacher. In order to permit the student to learn at his own rate, the apparatus may be adapted so as to continually repeat the sequences of images during the operation of the apparatus so that the student may view any one of the number of sequences or any combination of them until a particular sequence of images no longer holds his interest due to his having comprehended the subject matter being taught.

The apparatus and method according to this invention may be particularly useful in instructing persons who are sensorally handicapped but who have visual perception, because the sequences of pictorial representations and word representations of multiple symbolic forms of communication displayed of the same subject matter may be correlated by the student so that his comprehension of the subject matter taught is increased to the extent that the student may be able to reproduce the written portion on his own. The means for precluding visual display of one or more of the sequences of images displayed may be shutters, whereby the student may upon moving one or more of the shutters cover and uncover the respective constantly repeated sequence of images and by comparing the various sequences may confirm his understanding of the subject matter being taught and at the same time, increase his comprehension thereof.

The apparatus of this invention may also be self-motivating insofar as the progress that a student may make, in that response-actuated means may be provided to unlock a certain sequence of display after a correct response so as to allow progress to the next sequence or subject matter. Such apparatus may also be particularly useful when the student is working without the direct personal supervision of a teacher.

SUMMARY OF THE INVENTION

It is therefore an object of the invention to provide a method and apparatus for teaching a person how to communicate with other persons.

Another object of the invention is to provide a system which is oriented towards self-motivation and experimentation on behalf of the person being taught where the pupil learns from a display of a plurality of sequences of images which are presented in a synchronized manner so that they all clearly and closely relate in the most positive sense to identical subject matter.

It is yet another object of the invention to provide means on the apparatus for reproducing audible speech which relates directly to the subject matter being visually displayed.

BRIEF DESCRIPTION OF THE DRAWINGS

These objects and other features and advantages of the invention will become apparent upon reading the detailed description of a preferred embodiment of the invention as described below and illustrated in the drawings wherein.

DETAILED DESCRIPTION OF A PREFERRED EMBODIMENT

Figure 1:
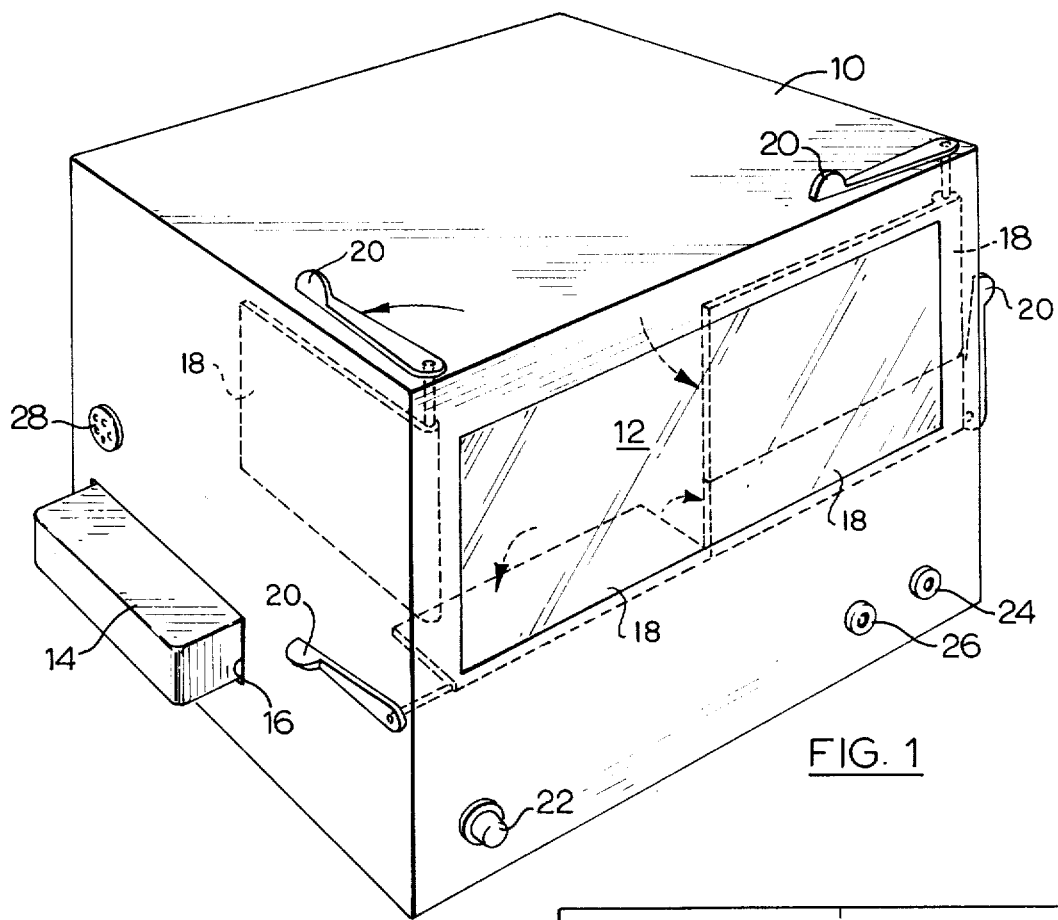
FIG. 1 is a perspective view of the apparatus according to this invention.

The apparatus shown in FIG. 1 uses a film projector positioned within enclosure 10 to project a plurality of sequences of images onto a motion picture screen 12. The sequences of images to be displayed on screen 12 are projected from a continuous film strip held in cassette 14 which is in turn received by the film projector through slot 16 of enclosure 10. Movable flaps or shutters 18 are movable to a position which precludes display of the respective sequence of images being displayed in the area covered by the shutter. Each shutter is provided with a handle 20 which is exterior of the enclosure and is operable to move the shutter accordingly. As shown, the motion picture screen 12 is divided into four quadrants by the adjacent peripheries of the shutters, the lower shutters being movable in a downward direction and the upper shutters being movable in a sideways direction. Each shutter is provided with the necessary stops to retain the shutter in either the desired open or closed positions.

To ensure a clear and vivid display of the images on motion picture screen 12, a focus knob 22 is provided to focus the film projector according to the condition of each film cassette 14.

When required, the film projector may have a sound reproducing apparatus provided thereon which plays back a recorded sound track on the film strip according to standard film projection procedures. The audible speech portion which describes the subject matter being taught may be heard through a loudspeaker provided within the enclosure 10 or through headphones which may be coupled to output jack 24 or through an extension speaker which may be coupled to output jack 26.

Figure 2:
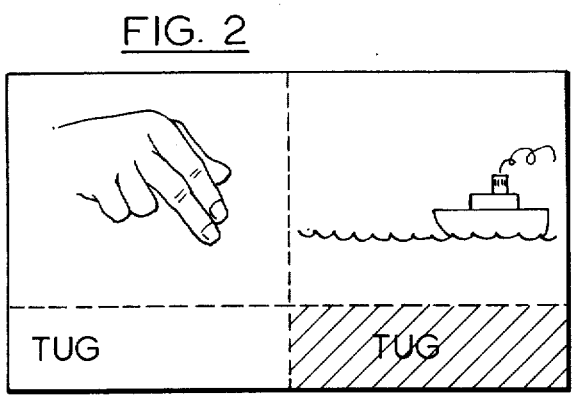
FIGS. 2, 3 and 4 are a related series of sequences of images which represent in any given figure identical subject matter, the images being displayed by the apparatus shown in FIG. 1.

As shown in FIGS. 2 through to 4, a series of four sequences of images is displayed on screen 12 where each image is displayed in a quadrant of the screen's surface. The projector for projecting these sequences of images may be that which is common to most motion picture film cassette type projection systems. The advantage in the film cassette concept is that the apparatus may be loaded and unloaded very simply. Although it is understood that other types of film projectors may be used such as the "reel-to-reel" type; and that video tape equipment may also be used. Another advantage in using a film cassette projector is also realized in that the apparatus may be easily used by the very young, the severely handicapped child or by people living in fairly remote locations. The apparatus may be constructed from a number of sub-assembly units so that repair of the apparatus may be easily effected by replacing one or more of the damaged or malfunctioning sub-assembly units.

As shown in FIGS. 2 through to 4, the sequences of images are shown side-by-side which may be accomplished by duplicating the film strip so that the frames of the sequences are side-by-side on the film strip. Considering a film projector which is common to that used in today's field, such as the 8 or 16 mm projector, the side-by-side sequential display of images may be done by placing on 16 mm film, a pair of 8 mm frames side-by-side so that for every standard 16 mm frame of film, there are two pairs of 8 mm frames, one pair below the other. The gate aperture of the projector would, therefore, accommodate the nonstandard dimension of 16 mm width but only half the standard 16 mm height. The 16 mm film would be advanced only half the standard advancement of the 6 m film, thereby displaying only one pair of 8 mm frames per unit advancement of the film. In using 16 mm film with standard perforations, the film may be advanced by adapting a standard Maltese Cross movement to drive the standard 16 mm intermittent sprocket so as to advance the film only one-half a frame per advancement; or by an adaptation of a standard 16 mm Geneva Movement so that the movement of the claw is stopped half way through its normal film advancing stroke at which point the claw and the film are held at rest for a normal projection cycle before completing the balance of the normal movement. The shutter of the projector therefore rotates at the standard number of revolutions of approximately 24 per second, however, the film transport mechanism whether it be of the Maltese Cross or Geneva Movement type, will drive 12, 16 mm frames per second. Cassette 14 for the film is also common to those used at present where the film is in the form of a loop to permit a continuous repeated display of the sequence of images. Depending upon the extent of subject matter being taught, the film loop may be of a limited size so that the loop can be simply inserted in the cassette as a free running loose convolution with few or no guide rollers or driving plate thereby requiring a minimum of moving parts within the film cassette, the mechanical portion of the drive system being entirely incorporated in the body of the projection machine.

The sequence shown in FIGS. 2 through to 4 is representative of the type of sequence of images which may be used to educate the student concerning the association between symbolic language and its real counterparts, and also about the manner in which sentences are constructed. The particular sequence shown concerns a tug pulling a ship where a continuous display will help the students learn to associate the words "tug" and "ship" with pictorial representations thereof and to learn the context of the verb "pull." In this particular instance, the student is considered to be deaf, in which case, the sequence of images shown in the upper left hand quadrant is that of a hand "signing" the subject matter being represented by the adjacent images simultaneously displayed, it being understood that more than one hand may be used in the "signing" of a word and that one hand is merely an illustration. The set-up of FIG. 2 is designed to solely display a tug where at the bottom of the pictorial representation of the tug, the word "tug" appears and similarly below the hand which is "signing" the subject matter being represented, the same word also appears simultaneously.

Figure 4:
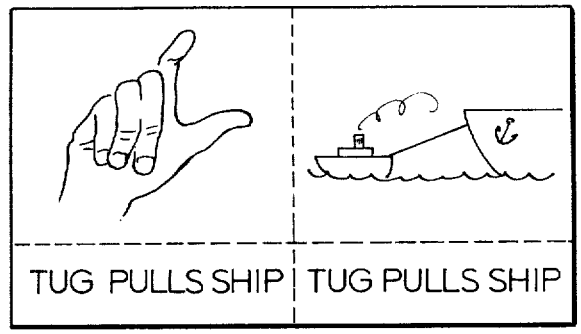
Figure 3:
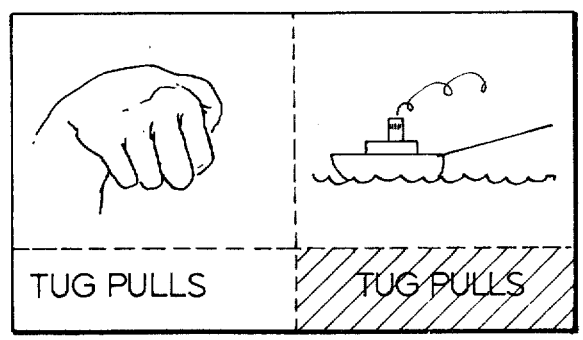

FIG. 3 is a progression in the same sequences of images wherein the tug is pictorially displayed as having a cable stretching from behind in taut condition. Below this pictorial representation, the words "tug pulls" appear and similarly below the hand "signing" the identical subject matter, the words "tug pulls" also appear. The end of the sequences of images is shown in FIG. 4 where it is revealed that the tug is pulling a ship by the taut cable. Below this pictorial representation, the words "tug pulls ship" appear and similarly below the hand which signs out the identical subject matter, the words "tug pulls ship" also appear.

The hand which is "signing" a word or letter may, in fact, be a hand or a pair of hands using either hand-spelling or sign-language techniques; or the display of the hand may be replaced by a display of a person's face speaking the words, so as to teach the student how to lip-read. Hand-spelling, signlanguage or lip-reading are all forms of what may be called "visual language" or "visual speech;" being a form of communicaation between persons, of whom one may be deaf. At the same time, audio-graphs, or the vibrations of a loudspeaker simulating the vibrations of a larynx may also be presented to the student; because such presentations are symbolic of words or communication having real meaning.

Shutters 18 are provided on the apparatus of FIG. 1 to mask one or all of the sequences of images displayed on screen 12, so that the student is not presented with all of these sequences at once because during the initial stages of using the apparatus, the association between the sequences of images being displayed may not be readily apparent to the student. During initial use of the device, the student may well wish to view only the pictorial representation of the subject matter being taught, and he may therefore mask the word sequences and the hand "signing" the same subject matter, by use of shutters 18. This selection of the shutters is, of course, optional and may be left to the discretion of the student. In other, more formally structured circumstances, a teacher may control the positioning of the shutters by manual or remote control. However, due to the fact that the apparatus is aimed at self-motivation and experimentation on behalf of the student, under most circumstances, the shutters may be left free to be moved by the student during initial use. As the student uses the apparatus, he may wish to open other combinations of shutters to learn the association between the sequences being shown; so that he can observe that the word sequence appears below both pictorial representations and deduce that the pictorial representations of each sequence of images are related to identical subject matter. Once the association between the various sequences of images has been established by the student closing and opening the various shutters and confirming in his mind that all of the sequences are positively related, he may then test his comprehension by covering up the word sequences and one of the pictorial representations and then by either reciting to himself, or by use of pencil and paper, print the subject matter as it is being displayed and test his comprehension by opening one or more of the shutters masking the word sequences to check his work. The shutters, therefore, serve the purpose of assisting the pupil's developing comprehension by permitting him to make his own association/observation at his own pace, and also confirm his understanding once he believes he has comprehended the subject matter. The student may also test his recall of the language previously learned; and the pupil may be able to work unattended; without the personal supervision of a teacher.

Although the sequences of images shown in FIGS. 2 through 4 are directed primarily at a deaf pupil, the apparatus may also be used to instruct those who are perceptually handicapped in other ways but with visual perception; or with those who are learning a new language, whether it be foreign or native, and who have hearing ability. Therefore an audible portion added to the presentation of the subject matter may be important since it acts on another of the student's senses, it being understood that the audible portion may also be present in instructing the totally deaf for purposes of simplicity in manufacturing the film cassettes. According to standard procedures in this field, the audible portion may be reproduced from the film which would have a sound track thereon and be sensed by a sound reproducing unit in the film projection apparatus. A loudspeaker may be placed within enclosure 10 or the pupil may listen to the audible portion through head phones or through an extension speaker. The audible portion is synchronized with the display of the sequences of images so that the speech which is reproduced, directly relates to the subject matter being visually displayed. This would be of particular assistance when a person is learning a new language because pronunciation is of prime consideration.

Further usage of the apparatus may also be considered with respect to the instruction of foreign languages to persons who are reasonably adept at using their native language. This may be done by displaying two sequences of images which may be the words to be learned in the foreign language and the corresponding words of the pupil's native language, there being an audible speech portion to the presentation of the sequences of foreign language images to ensure that the correct pronunciation of the words is learned. Also, depending upon the student's age and degree of comprehension, it may be desirable to present to the student only one word sequence and a sequence of associated pictorial representations, or different pictoral representations depending upon the subject matter being presented.

As to the method of operating the apparatus according to this invention, it is apparent that the apparatus may be activated as soon as the cassette is inserted into the film projector so that an immediate display of the sequences of images would appear on projection screen 12. Depending upon the student's abilities, it may be advantageous during the initial use of the apparatus by the student, to have a teacher stand by and selectively work the shutters so as to present to the student the images in a pedantic order and thereby to overcome confusion which may arise if the student were left on his own to operate the apparatus. However, as previously discussed, the student may be left on his own to operate the apparatus, since such use by the student is directed towards self-motivation. Teacher instruction may also be done on a group basis, whereby use may be made of the remotely controlled servo mechanisms so that one teacher could instruct a class of students, each having his own teaching apparatus.

In preparing the sequences of images to be displayed, it is understood that the potential and scope of the teaching apparatus for teaching a wide range of subject matter to people is relatively unlimited compared to present techniques as previously discussed. For example, in the teaching of nouns and verbs to a person, one may work on a particular verb such as "pull" and by using various subjects and objects teach the meaning of "pull" to the student. Considering the sentence "tug pulls ship," the student not only learns the meaning of the words "tug" and "ship" but also learns the meaning and connotation of the verb "pull". By further associations with the verb "pull" — e.g. by visual displays such as "boy pulls dog," "truck pulls car," etc. — the meaning of the verb can be firmly established in the student's mind and, at the same time, broaden the student's vocabulary.

The examples given thus far relate to the types of subject matter which may be represented by sequences of images, and do not refer to the use of definite and indefinite articles. The proper use of such words has presented an instruction problem for some time. However, the method and apparatus according to this invention permits such instruction by presenting to the student sequences of images which represent groups and sub-groups of identical objects, where one of the objects during the sequence may be particularly distinguished as the object, thereby distinguishing between an object and the object of a group. As a result, through continued repetition, the distinction between the indefinite and definite articles may be made.

One of the principal consideration in preparing a plurality of sequence of images to be displayed and which represent the desired subject matter to be taught, is that there should be a direct and positive association between the various sequences of images being displayed so that the student does not become confused over extraneous bits of matter which need not appear in the images. Also, there should be a synchronization of the various sequences so that when the student compares the various sequences, there is a direct and positive confirmation of identical subject matter being displayed.

Self-motivation on the part of the student, — particularly with children or other persons with sensory handicaps or learning disabilities — while using the apparatus, is also an essential factor in accounting for the student's using the apparatus since he may learn at his own pace by experimenting with the apparatus, and by operating the shutters and confirming his comprehension of the subject matter being taught. In addition, when he has satisfied himself that he understands the particular sequences of images being displayed, he may then remove that particular film cassette and insert another film cassette relating to other subject matter and experiment further, the end result being that the student may have access to an unlimited amount of material and learn at his own pace. Therefore, once the student becomes adept in operating the apparatus and understands the function of the apparatus, he can entertain himself for hours and at the same time, learn the various skills of communication.

While various embodiments of the invention have been illustrated and described in detail, it is understood that changes may be made without departing from the spirit of the invention or the scope of the appended claims.

I claim:

1. An apparatus for teaching a person how to communicate with other persons comprising:
means for simultaneously visually displaying at least four sequences of images which relate to communication among persons and which are different visual representations of identical subject matter, said display of sequences being uninterrupted and means selectively operable for optionally precluding visual display of at least one of said sequences of images to the person being taught;
at least two of said sequences being a series of pictorial representations of the subject matter being taught and the remaining sequences being word sequences representing the same subject matter, the presentation of said at least four sequences being the simultaneous display of a word or a group of words of said word sequences which corresponds with the pictorial representations being then displayed.

2. An apparatus of claim 1 wherein said means for displaying said sequences of images is a film cassette projector which receives cassettes having a continuous loop of film to permit continuous repeat of the display of said sequences of images during operation of said apparatus.

3. An apparatus of claim 1 wherein said means for precluding visual display of at least one of said sequences of images is adapted to be operated by the person being taught.

4. An apparatus of claim 1 wherein four sequences of images are displayed in an area which is divided into four quadrants, each sequence of images being displayed in one of said quadrants.

5. An apparatus of claim 1 further including means for reproducing audible speech relating to the subject matter being visually displayed.

6. A method for teaching a person how to communicate with other persons comprising the steps of:
displaying simultaneously at least four sequences of images to the person being taught, which relate to communication among persons and which are different visual representations of identical subject matter, and
selectively precluding on an optional basis the visual display of at least one of said sequences of images to the person being taught;
at least two of said sequences being identical word sequences; and
the remaining sequences of images being different symbolic representations of the identical subject matter of said at least two word sequences which are momentarily displayed to the person being taught.

7. A method of claim 6 adapted to teach communication to deaf persons wherein one of said remaining sequences is composed of a series of representations of a person expressing the subject matter in terms of visual language.

8. A method of claim 6 wherein each word once displayed, remains displayed until the word sequence is completed.

* * * * *